(12) United States Patent
Konagai et al.

(10) Patent No.: US 9,193,840 B2
(45) Date of Patent: *Nov. 24, 2015

(54) CARBON FIBER COMPOSITE MATERIAL (75) Inventors: Yuhei Konagai, Shizuoka (JP); Yutaka Kondo, Shizuoka (JP); Naoaki Sonoda, Shizuoka (JP)

(73) Assignee: Teijin Limited, Osaka-shi, Osaka (JP)

( * ) Notice: Subject to any disclaimer, the term of this patent is extended or adjusted under 35 U.S.C. 154(b) by 518 days.

This patent is subject to a terminal disclaimer.

(21) Appl. No.: 13/617,301

(22) Filed: Sep. 14, 2012

(65) Prior Publication Data
US 2014/0080961 A1    Mar. 20, 2014

(51) Int. Cl.
C08K 3/04    (2006.01)
C08J 5/04    (2006.01)

(52) U.S. Cl.
CPC ........................................ *C08J 5/042* (2013.01)

(58) Field of Classification Search
USPC .......................................................... 524/495
See application file for complete search history.

(56) References Cited

U.S. PATENT DOCUMENTS

2013/0317161 A1*  11/2013  Konagai et al. ............... 524/495

FOREIGN PATENT DOCUMENTS

| JP | S57-117661 A | 7/1982 |
|---|---|---|
| JP | H04-163109 A | 6/1992 |
| JP | H05-132568 A | 5/1993 |
| JP | 06-099431 | 4/1994 |
| JP | 09-286036 A | 4/1997 |
| JP | 2002-212311 A | 7/2002 |
| JP | 2004-043985 A | 2/2004 |
| JP | 2006-077343 | 3/2006 |
| JP | 4161409 B2 | 10/2008 |
| JP | 2009-114611 A | 5/2009 |
| JP | 2009-114612 A | 5/2009 |
| WO | WO2012/105080 | * 9/2012 .......... D04H 1/4218 |

OTHER PUBLICATIONS

Information Offer filed in corresponding Japanese Application No. 2010-044287, dispatched on Apr. 8, 2014.

(Continued)

*Primary Examiner* — Ling Choi
*Assistant Examiner* — Thuy-Ai Nguyen
(74) *Attorney, Agent, or Firm* — Banner & Witcoff, Ltd.

(57) ABSTRACT

A composite material includes: carbon fibers having an average fiber length of more than about 10 mm and about 100 mm or less; and a thermoplastic resin. The carbon fibers are substantially two-dimensionally-randomly oriented. The composite material includes a carbon fiber bundle (A) in a ratio of about 30 volume % or more and less than about 90 volume % to a total volume of the carbon fibers, the carbon fiber bundle (A) including the carbon fibers of a critical single fiber number defined by formula (1) or more. An average number (N) of the carbon fibers in the carbon fiber bundle (A) satisfies formula (2).

$$\text{Critical single fiber number} = 600/D \quad (1)$$

$$6 \times 10^4 / D^2 < N < 2 \times 10^5 / D^2 \quad (2)$$

D is an average fiber diameter (μm) of the carbon fibers.

10 Claims, 3 Drawing Sheets

(56) References Cited

OTHER PUBLICATIONS

Office Action dated Dec. 17, 2013 in counterpart Japanese Application 2010-044287.

L.T. Harper et al., "Characterisation of random carbon fibre composites from a directed fibre preforming process: The effect of tow filamentisation," Sep. 5, 2006, School of Mechanical, Materials and Manufacturing Engineering, University of Nottingham, The ITRC Building, University Park, Nottingham NG7 2RD, UK, www.sciencedirect.com (Composites: Part A 38 (2007) 755-770), www.elsevier.com/locate/compositesa.

* cited by examiner

CARBON FIBER COMPOSITE MATERIAL

BACKGROUND

1. Technical Field

The present invention relates to a fiber reinforced composite material which includes a thermoplastic resin as a matrix, and more particularly, a carbon fiber composite material which is excellent in development of reinforcing function by composite of carbon fibers.

2. Background Art

As a fiber-reinforced composite material using a carbon fiber, an aramid fiber, a glass fiber, or the like as a reinforcement fiber, an isotropic random mat is used from standpoints of formativeness and process simplicity. This random mat can be obtained by a spray-up method ("dry type" method) in which cut reinforcement fibers and a thermosetting resin are sprayed on a forming die simultaneously, or a method ("wet type" method) of adding a reinforcement fiber, which is previously cut, into a slurry containing a binder, and carrying out paper-making from the slurry.

It was known to increase fiber volume content (Vf) as means for improving mechanical physical property of a composite material, but it is difficult to increase the fiber volume content in a random mat using cut fibers for several reasons. For one, fibers are present along directions intersecting with the plane of the random mat at substantial angles and crossing of fibers is likely to occur. Also, it was difficult to adequately develop the strength of reinforcement fibers as compared with that from continuous fibers since fibers in the random mat are discontinuous. As a result, in known composite materials, the development rate of strength, which is a ratio of the tension strength of a shaped product and the tension strength of reinforcement fibers which constitute the shaped product, was generally less than about 5%.

Composites Part A, vol. 38 (2007), pp. 755-770 discloses a composite material of a random mat including carbon fibers and a thermosetting resin as a matrix, but the development rate of strength of the reinforcement fibers in the composite material is less than about 3.8%.

In recent years, techniques for improving mechanical physical property of a composite material using a random mat involved using chopped fiber bundles in which the cross-sectional areas are changed by cutting fiber bundles at slants of angles (JP-A-2009-114611 and JP-A-2009-114612). According to such a method, it was possible to improve the development rate of strength of reinforcement fibers from about 3 to 4% in the related art to about 7%, but not more than 10%.

As described above, a composite material in which a thermosetting resin is used as matrix was proposed. Usually, a fiber-reinforced composite material is obtained by heating and pressurizing a material called a prepreg which is previously obtained by impregnating a fiber-reinforced base material with a thermosetting resin, for 2 hours or more using an autoclave. In recent years, there was proposed an RTM (Resin Transfer Molding) method in which a thermosetting resin is poured into a mold in which a fiber-reinforced base material not impregnated with a resin is set, and the molding time was shortened substantially. However, even when the RTM method is utilized, it takes 10 minutes or more to mold a single part.

Therefore, a composite using a thermoplastic resin as a matrix instead of a thermosetting resin is attracting attention. However, a thermoplastic resin generally has a higher viscosity than a thermosetting resin, and thus the time for impregnating a fiber base material with the resin is long and, as a result, the tact time up to molding becomes long.

As a technique of solving the above matters, a technique called a thermoplastic stamping molding (TP-SMC: Thermoplastic-Sheet Molding Compound) is proposed (for example, Japanese Patent No. 4161409). This is a molding method of: heating chopped fibers, which are previously impregnated with a thermoplastic resin, at a temperature of more than the melting point; supplying the chopped fibers to a part in a mold and immediately after that, closing the mold; making fibers and a resin flowing within the mold to produce a product configuration; and cooling and molding of the product. In this technique, molding can be completed in short time of about 1 minute by using the fibers previously impregnated with the resin. This technique uses a molding material which is called SMC or a stampable sheet. In this thermoplastic stamping molding, due to flowing fibers and a resin within a mold, a thin product cannot be produced and the orientations of the fibers are not aligned and are difficult to control.

For a composite material including a thermoplastic resin as a matrix, there is proposed a technique of an injection molding of filament pellets including a reinforcement fiber (JP-A-9-286036). However, even for a filament pellet, the length of the pellet is limited, and that the reinforcement fiber is cut in the thermoplastic resin by kneading and mixing, thus the length of the reinforcement fiber is unable to be maintained. Further, reinforcement fibers are oriented in a forming method such as an injection molding, and thus an isotropic product cannot be obtained.

SUMMARY

In one aspect, a composite material has superior mechanical physical property that was previously unattainable using thermoplastic resin based composite materials. In another aspect, a composite material is excellent in development of reinforcing function by composite of carbon fibers.

In one embodiment, a carbon fiber composite material includes a thermoplastic resin and carbon fibers that satisfies a specific fiber opening condition. The composite material has superior mechanical physical property and can be formed into thin products.

In one embodiment composite material includes: carbon fibers having an average fiber length of more than about 10 mm and about 100 mm or less; and a thermoplastic resin. The carbon fibers are substantially two-dimensionally-randomly oriented in the composite material. The composite material includes a carbon fiber bundle (A) in a ratio of about 30 volume % or more and less than about 90 volume % to a total volume of the carbon fibers, and the carbon fiber bundle (A) includes the carbon fibers of a critical single fiber number defined by formula (1) or more. An average number (N) of the carbon fibers in the carbon fiber bundle (A) satisfies formula (2).

$$\text{Critical single fiber number} = 600/D \quad (1)$$

$$6 \times 10^4/D^2 < N < 2 \times 10^5/D^2 \quad (2)$$

In formulae (1) and (2), D is an average fiber diameter (μm) of the carbon fibers.

The reference numerals in the drawings are set forth below.
1: Carbon fiber strand
2: Pinch roller
3: Rubber roller
4: Main body of rotary cutter
5: Edge
6: Cut carbon fiber
7: Angle between circumferential direction of rotary cutter and arrangement direction of edges

DETAILED DESCRIPTION

A composite material as described herein may develop high mechanical strength and further can become thinning and isotropic. Thus, the composite material can be used for various component members, for example, an inner plate, outer plate, and components members of automobiles, and frames and housings of various electric products and machines.

(Composite Material)

A composite material includes: carbon fibers having an average fiber length of more than about 10 mm and about 100 mm or less; and a thermoplastic resin. The carbon fibers are substantially two-dimensionally-randomly oriented in the composite material. The composite material includes a carbon fiber bundle (A) in a ratio of about 30 volume % or more and less than about 90 volume % to a total volume of the carbon fibers, and the carbon fiber bundle (A) includes the carbon fibers of a critical single fiber number defined by formula (1) or more. An average number (N) of the carbon fibers in the carbon fiber bundle (A) satisfies formula (2).

$$\text{Critical single fiber number} = 600/D \qquad (1)$$

$$6 \times 10^4/D^2 < N < 2 \times 10^5/D^2 \qquad (2)$$

In formulae (1) and (2), D is an average fiber diameter (μm) of the carbon fibers.

The language "carbon fibers are substantially two-dimensionally-randomly oriented" means that carbon fibers in a composite material has a principle orientation direction of fiber axes thereof in a tangent surface of the composite material, and when the modulus of elasticity in tension is measured in each of two directions at right angles to each other in the tangent surface, the ratio of a larger modulus of elasticity in tension to a smaller one does not exceed 2.

(Carbon Fiber)

A carbon fiber which constitutes a composite material may be discontinuous, and the carbon fiber has an average fiber length of more than about 10 mm and about 100 mm or less. A composite material may include to some extent long carbon fiber, and can develop reinforcing function. The average fiber length is usually from about 15 mm to 100 mm, more often from about 15 mm to 80 mm, and most typically from about 20 mm to 60 mm. The matrix resin is typically a thermoplastic resin and the composite material can be obtained by a manufacturing method as described below without the need for melting and kneading and mixing. Accordingly, the length of carbon fibers used can be maintained in the composite material, and carbon fibers having a uniform fiber length can be included in a composite material, thus providing, a composite material having homogeneous physical property.

An average fiber diameter of carbon fibers which constitute a composite material is usually about 3 to 12 μm, often about 5 to 8 μm, and more usually 5 to 7 μm.

As for a carbon fiber, one to which a sizing agent is attached is often used, and an amount of the sizing agent is usually 0 to about 10 parts by weight to 100 parts by weight of the carbon fibers.

(Degree of Opening)

Generally, carbon fibers form a fiber bundle in which several thousands to several tens of thousands of filaments (fibers) are gathered. When a thin composite is to be obtained especially, if carbon fibers are used with fiber bundles as they are, the crossing portion of the fiber bundles becomes thick locally and the thin composite cannot be obtained. Therefore, it is important to open a fiber bundle of carbon fibers and to use the opened carbon fibers. In a composite material as described herein, the degree of opening of a fiber bundle of carbon fibers is controlled, and a carbon bundle of a specific number or more carbon fibers and other opened carbon fibers may be included in a specific ratio.

A composite as described herein includes a carbon fiber bundle (A) in a ratio of about 30 volume % or more and less than about 90 volume % to a total volume of the carbon fibers. The carbon fiber bundle (A) includes the carbon fibers of a critical single fiber number defined by formula (1) or more.

$$\text{Critical single fiber number} = 600/D \qquad (1)$$

(D is an average fiber diameter (μm) of the carbon fibers.)

As carbon fibers other than the carbon fiber bundle (A), a single fiber or a fiber bundle having the carbon fibers of the critical single fiber number or less may be present in the composite material.

If the ratio of the carbon fiber bundle (A) is less than about 30 volume %, there is an advantage in obtaining a composite material excellent in surface quality, but it becomes difficult to obtain a composite material excellent in mechanical physical property. If the ratio of the carbon fiber bundle (A) is about 90 volume % or more, the crossing portion of the fiber bundles may become thick locally and a thin composite cannot be obtained.

In some examples, an average number (N) of the carbon fibers in the carbon fiber bundle (A) constituted by the carbon fibers of the critical single fiber number or more satisfies formula (2).

$$6 \times 10^4/D^2 < N < 2 \times 10^5/D^2 \qquad (2)$$

(D is an average fiber diameter (μm) of the carbon fibers.)

When the average number (N) of the carbon fibers in the carbon fiber bundle (A) is less than $6 \times 10^4/D^2$, it may become difficult to obtain a high fiber volume content (Vf). When the average number (N) of the carbon fibers in the carbon fiber bundle (A) exceeds $2 \times 10^5$, some portions may become thick locally, which can cause voids.

As seen above, by making a composite material including both of: the carbon fiber bundle (A) including the carbon fibers of the critical single fiber number defined by formula (1) or more; and a carbon fiber bundle (B) including a carbon fiber in a state of single fiber or carbon fibers of less than the critical single fiber number, it is possible to provide the composite material in which the filing efficiency of fibers is good, there is little variation in density of fibers, and the mechanical strength is excellent.

Further, by making the carbon fiber bundle including the specific number or more carbon fibers and other opened carbon fibers coexistent in the specific ratio, it is possible to increase the amount of carbon fibers in the composite material, i.e., the fiber volume content (Vf).

In some examples, the average fiber diameter of the carbon fibers which constitute a composite material is about 5 to 8 μm, the critical single fiber number is about 86 to 120, and the ratio of the carbon fiber bundle of the critical single fiber number or more carbon fibers to the total volume of the carbon fibers is about 30 volume % or more and less than about 90 volume %.

When the average fiber diameter of carbon fibers is 5 μm, the average number of carbon fibers in a fiber bundle often ranges inform about 2,400 to 8,000, more usually from about 2,500 to 6,000. When the average fiber diameter of carbon fibers is 8 μm, the average number of carbon fibers in a fiber bundle often ranges inform about 1,224 to 4,081, and more usually from about 1,500 to 4,000.

A composite material as described herein can have various kinds of thickness, and can provide a thin shaped product, for example having a thickness of about 0.2 to 1 mm. Namely, it is possible to provide a composite material which conforms to thicknesses for various purposes, and is especially useful to form a thin shaped product which can be used as a skin layer of a sandwich material.

(Thermoplastic Resin)

An amount of a thermoplastic resin in a composite material often ranges from about 50 to 1,000 parts by weight to 100 parts by weight of carbon fibers. Often the amount of a thermoplastic resin ranges from about 50 to 500 parts by weight to 100 parts by weight of carbon fibers, more usually from about 50 to 100 parts by weight to 100 parts by weight of carbon fibers.

Examples of the thermoplastic resin include vinyl chloride resin, vinylidene chloride resin, vinyl acetate resin, polyvinyl alcohol resin, polystyrene resin, acrylonitrile-styrene resin (AS resin), acrylonitrile-butadiene-styrene resin (ABS plastics), acrylic resin, methacrylic resin, polyethylene resin, polypropylene resin, polyamide 6 resin, polyamide 11 resin, polyamide 12 resin, polyamide 46 resin, polyamide 66 resin, polyamide 610 resin, polyacetal resin, polycarbonate resin, polyethylene terephthalate resin, polyethylene naphthalate resin, polybutylene terephthalate resin, polyarylate resin, polyphenylene ether resin, polyphenylene sulfide resin, polysulfone resin, polyether sulfone resin, and polyether ether ketone resin. Otherwise, two or more thermoplastic resin can be used in combination.

(Other Additives)

Other additives may include fibrous filler such as glass fiber and organic fiber, non-fibrous filler, flame retardant, anti-UV agent, pigment, mold lubricant, softener, plasticizer, and surfactant. The types and amounts of additives should be selected so as not to impair the desired properties of the composite material.

(Development of Reinforcing Function by Carbon Fiber)

A composite material as described herein can develop the strength of about 60 to 80% to the theoretical strength value in a composite material including carbon fibers in a two-dimensionally pseudo-isotropic random fashion. While not wanting to be bound by theory, it is believed that the reason why such a development rate of strength can be achieved may be that carbon fibers effectively exist in the composite material by making the carbon fiber bundle including the specific number or more carbon fibers and other opened carbon fibers coexistent in the specific ratio.

(Manufacturing Method)

A suitable method for obtaining a composite material is described below. A composite material may be manufactured by the following steps 1 to 5.
1. Step of cutting carbon fibers;
2. Step of opening a carbon fiber bundle into carbon fibers to some extent discretely by introducing cut carbon fibers (which include the carbon fiber bundle not opened) in a tube and blowing air onto the cut carbon fibers;
3. Step of, while diffusing the opened carbon fibers, sucking the carbon fibers together with a thermoplastic resin in fibrous or powder from, and spraying the carbon fibers and the thermoplastic resin simultaneously;
4. Step of fixing the carbon fibers and the thermoplastic resin sprayed to produce a random mat (random oriented fiber mat); and
5. Step of press forming the random mat.

(Cutting Step)

Figure 1:
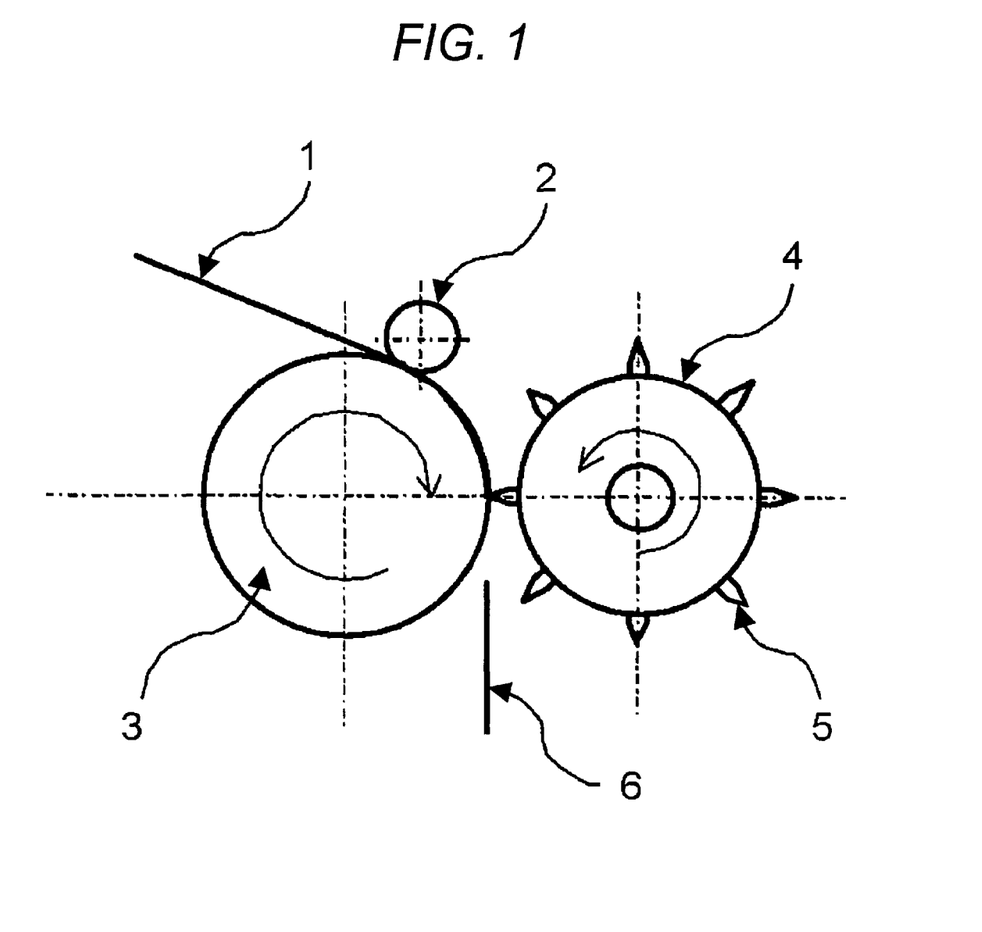
FIG. 1 is a schematic view of a cutting process of fibers.
Figure 2A:
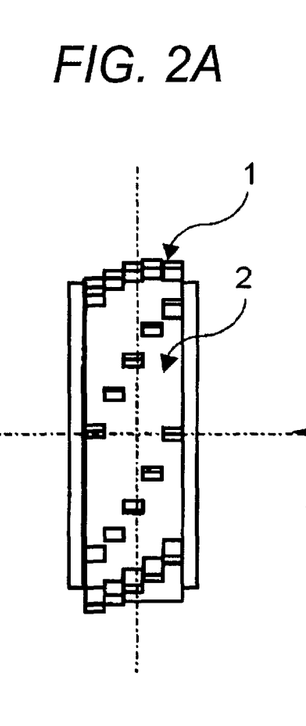
FIG. 2A is a front view of a rotary fiber separating cutter.
Figure 2B:
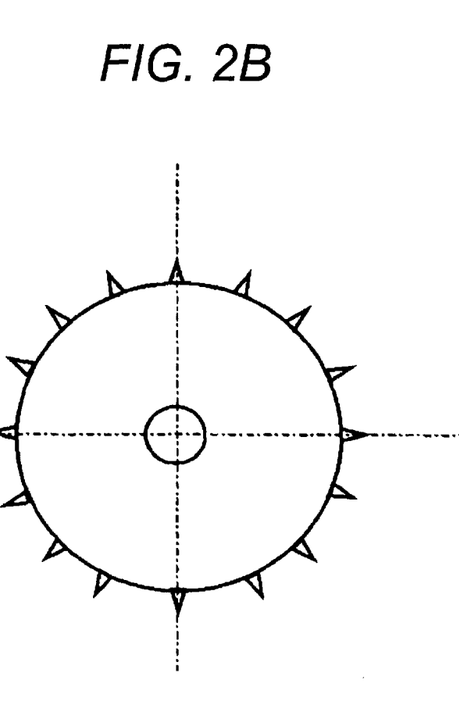
FIG. 2B is a cross-section view of the rotary fiber separating cutter.
Figure 3:
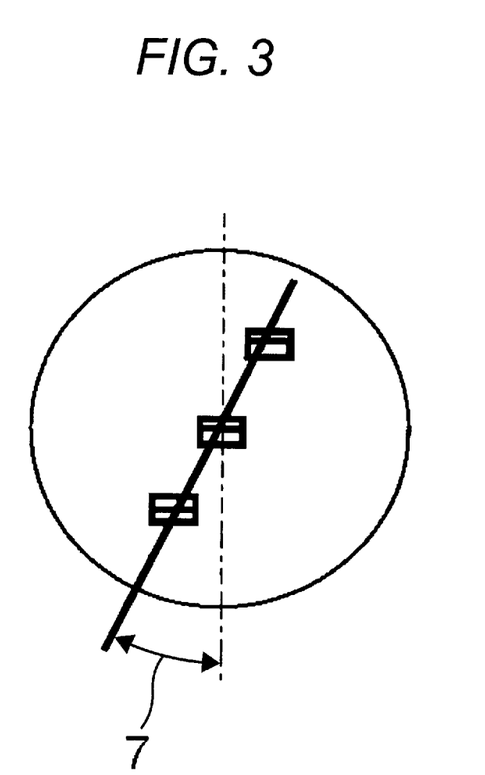
FIG. 3 is an explanatory view of a knife angle.

A step of cutting a carbon fiber is described. The carbon fiber may be cut with a knife such as a rotary cutter. An embodiment of the cutting step using a rotary cutter is shown in FIG. 1. In some examples, the rotary knife is a fiber separating cutter that cuts a fiber bundle to separate the fiber bundle by about ½ to 1/20. An example of a rotary fiber separating cutter is shown in FIGS. 2 and 3. FIG. 2A is a front view of the cutter and FIG. 2B is a cross-section view of the cutter, and FIG. 3 is an explanatory view of a knife angle of the cutter. The rotary fiber separating cutter is configured to arrange a plurality of edges at equal intervals and spirally along the main part of the cutter. In a known method of cutting fiber bundles as they are and applying the cut fiber bundles, it is difficult to obtain a composite material which is thin and excellent in physical property. By cutting fiber bundles to separate the fiber bundles into thinner bundles, the homogeneity of a random mat obtained in the above-mentioned step 4 is improved and a thin random mat can be obtained. The knife angle for continuously cutting a carbon fiber is not limited. In some examples, a knife angle which is at 90 degrees to a fiber may be used, and in other examples a knife angle which is at any degree(s) other than 90 degrees to a fiber may be used.

(Step of Fiber Opening)

Subsequently, the cut carbon fibers which include a fiber bundle not opened are introduced in a tube and the fiber bundle is opened into carbon fibers discretely by blowing air onto the cut carbon fibers. Concretely, this step is a process of continuously introducing the cut carbon fibers in a tube and blowing pressure air onto the cut carbon fibers directly to open a fiber bundle into carbon fibers discretely. The degree of opening can be properly controlled by the pressure of the blowing air.

One suitable method of opening a fiber bundle of carbon fibers is blowing compressed air onto the carbon fibers directly. In this method, by blowing air at a wind speed of about 5 to 500 msec through a compressed air blowing hole, it is possible to open a carbon fiber bundle of carbon fibers nearly completely. A fiber bundle can be easily opened by blowing compressed air onto the fiber bundle directly, at a pressure of about 0.01 to 0.8 MPa applied from outside, through several holes having a diameter Φ of about 1 mm on the tube through which carbon fibers passes (Step of Spraying)

Subsequently, a spraying step is performed, in which the opened carbon fibers are diffused and at the same time they are sucked together with a thermoplastic resin in fibrous or powder form, and the carbon fibers and the thermoplastic resin are sprayed simultaneously. A composite material may be obtained by spraying opened carbon fibers and a thermoplastic resin in fibrous or powder form at the same time on a sheet.

In a spraying step, the amount of thermoplastic resin supplied usually ranges from about 50 to 1,000 parts by weight to 100 parts by weight of carbon fibers. More often, it is about 50 to 400 parts by weight to 100 parts by weight of carbon fibers, and most usually from about 50 to 100 parts by weight to 100 parts by weight of carbon fibers.

A composite material having a desired thickness can be obtained by the amounts of carbon fibers and a thermoplastic resin supplied in a spraying step.

Here, it is expeditious to spray carbon fibers and a thermoplastic resin in a fibrous or powder form so that the carbon fibers are oriented two-dimensionally. In order to spray opened carbon fibers to be oriented two-dimensionally, the spray method and the fixing method as described below may be used. For spraying carbon fibers, for example, a taper tube in a cone form may be used. Within the tube in a cone form, air diffuses and the flow speed of the air in the tube decreases, and then a rotational force is applied to carbon fibers. By utilizing this Venturi effect, opened carbon fibers can be readily diffused and sprayed.

In some examples, carbon fibers are sprayed on a breathable sheet provided in the lower part of a fiber opening apparatus. Also, it is advantageous to spray carbon fibers on a movable breathable sheet having a suction mechanism for the following fixing step.

(Step of Fixing)

Subsequently, the sprayed carbon fibers and thermoplastic resin are fixed to obtain a random mat. Concretely, the sprayed carbon fibers and thermoplastic resin are sucked by air from the lower side of a breathable sheet to fix the carbon fibers, and thus a random mat is obtained. The thermoplastic resin which was sprayed together with the carbon fibers are mixed with the carbon fibers and if the thermoplastic resin is in a fibrous form, it is fixed by air suction. If the thermoplastic resin is in a powder form, it is fixed along with the carbon fibers.

Specifically, air suction is preformed from the lower side of a breathable sheet to obtain a random mat of high two-dimensional orientation. It is possible to suck a thermoplastic resin in a powder or short fibrous form by negative pressure occurred and further to easily mix the thermoplastic with carbon fibers. In the obtained random mat, a thermoplastic resin is present near carbon fibers, and thus it is possible to impregnate the carbon fibers with the thermoplastic resin for a comparatively short time in the following press step since the moving distance of the thermoplastic resin is short.

(Press)

Subsequently, the obtained random mat may be subjected to press forming to produce a composite material. At this time, two or more random mats can be stacked to obtain a composite material having a desired thickness. The method and conditions of press forming are not limited. In some examples, hot press conditions include a temperature ranging from the melting point of the thermoplastic resin which is a matrix to the temperature of the melting point+80° C. or the temperature of decomposition of the thermoplastic resin. The press pressure and press time can be appropriately selected.

(Shaped Product)

A composite material can be formed into a shaped product having a desired thickness, by press forming as described above. Also, a shaped product having a desired shape such as a three-dimensional shape can be formed by selecting the form of a mold. In some examples, the moving distance of a resin is short and impregnation of the resin can be performed for a comparatively short time, in a press step. Further, carbon fibers isotropically exist in the shaped product, so homogeneity is secured.

A shaped product may be a layered structure. Examples of a suitable methods of manufacturing such a layered structure include a method of: for example in a fixing step, arranging a sheet such as a random mat using glass fiber or organic fiber, or non-woven cloth, which has air permeability, on a breathable sheet; and applying carbon fibers on the sheet.

Since a thin shaped product is obtained, it can be used as a skin layer of a sandwich material. The core material of the sandwich material is not limited, but by way of example it can be a foam of a resin or non-woven cloth of glass fiber or organic fiber. The shaped product from a composite material may be stacked with a core material and, for example, the stacked one can be press-formed to produce a sandwich material. For a layered structure with non-woven cloth of glass fiber or organic fiber as described above, the non-woven layer can be used as a core material of a sandwich material.

EXAMPLES

Examples are described below, but the present invention is no limited thereto.

(How to Measure the Ratio of Carbon Fiber Bundle (A) to a Total Quantity of Carbon Fibers in a Composite Material)

1) A composite material is cut to a sample having a size of 100 mm×100 mm. After the thickness (Ta) of the sample is measured, the sample is heated in a furnace at 500° C. for about 1 hour to remove resin.
2) All fiber bundles are taken with tweezers from the sample from which resin is removed.
3) For all the fiber bundles, the length (Li) and weight (Wi) of each of the fiber bundles and the number (I) of the fiber bundles are measured and recorded. With respect to fiber bundles which are too small to be taken with tweezers from the sample, the total weight (Wk) of the fiber bundles are collectively measured at the end. For the measurement, a balance which is measurable to 1/1,000 g is used. When the fiber length of a fiber bundle is short, the weight of the fiber bundle is small and is difficult to be measured. In such a case, fiber bundles are classified in terms of fiber bundle width at an interval of about 0.2 mm, a plurality of fiber bundles classified in the same group are gathered, and the weight of the gathered fiber bundles are measured and its average weight value may be used.

The critical single fiber number is calculated based on the average fiber diameter (D) of the carbon fiber used in the composite material, and all the fiber bundles are separated into a group of fiber bundles (carbon fiber bundle (A)) having carbon fibers of the critical single fiber number or more; and a group of fiber bundles having carbon fibers of less than the critical single fiber number. For each group, the above measurement and evaluation is performed.

4) After the measurement for all the fiber bundles, the following calculations are performed. Using the tex (F) of used carbon fibers, the number (Ni) of fibers in each of the fiber bundles can be calculated by the following formula.

$$Ni = Wi/(Li \times F)$$

The average number (N) of fibers in a carbon fiber bundle (A) can be calculated by the following formula.

$$N = \Sigma Ni/I_A$$

Here, $I_A$ represents the number of carbon fiber bundles (A) in the sample.

The ratio (VR) of the carbon fiber bundles (A) to the total volume of carbon fibers in the sample can be calculated by the following formula, using the density (ρ) of carbon fibers used.

$$VR = \Sigma(Wi/\rho) \times 100/((Wk + \Sigma Wi)/\rho)$$

For reference, the fiber volume content (Vf) of the sample can be calculated by the following formula.

$$Vf = (Wk + \Sigma Wi)/\rho \times 100/Va$$

Here, Va is the volume of the sample, Va=100×100×Ta.

(How to Measure the Development Rate of Strength of Fiber)

The tensile strength of the sample of an obtained composite material was measured according to JIS K7164. The development rate of fiber strength is defined by a ratio of the tensile strength of the composite material and the tensile strength of the carbon fibers.

Example 1

"TENAX" (registered trademark) STS40-24KS (Fiber diameter: 7 μm, Tensile strength: 4,000 MPa) manufactured by TOHO TENAX Co., Ltd. was used as a carbon fiber. As a cutting apparatus, a rotary cutter having edges formed of cemented carbide was used. In this regard, the angle of edges with respect to the circumferential direction of the rotary cutter was degrees and the edge width was 1 mm. The edges were arranged in the circumferential direction at a pitch of 16 mm, and further the edges adjacent to each other were arranged in 1 an offset of 1 mm to each other. As a fiber opening apparatus, a tube having small holes were prepared and compressed air was supplied via the small holes using a compressor. The wind speed through the small holes was 100 msec. This tube was placed just below the rotary cutter and the lower part of the tube had a taper tube welded. A matrix resin was supplied from the lateral side of the taper tube. A pellet of polycarbonate, "Panlite" (registered trademark) L-1225L manufactured by TEIJIN CHEMICALS LTD. was cold-pulverized and classified by mesh 20 and mesh 30 into powder, and the powder was used as the matrix resin. The average particle diameter of the powder was about 1 mm. Next, a table movable in X-Y directions was placed below the exit port of the taper tube and suction was made by blower from the lower side of the table. The supplying amount rate of the carbon fibers and the supplying amount rate of the matrix resin were set to 600 g/min and 500 g/min, respectively, and the opening apparatus was operated to obtain a random mat having a thickness of about 2 mm, in which the carbon fibers having the average fiber length of 16 mm and the polycarbonate were mixed. This random mat was heated for 5 minutes at 2.0 MPa with a pressing device heated at 300° C. to obtain a shaped plate having a thickness t=0.8 mm. With respect to the obtained composite material (shaped plate), the fiber volume content (Vf) was 44%.

With respect to the obtained composite material (shaped plate), the critical single fiber number defined by formula (1) was 86, the average number (N) of carbon fibers in the carbon fiber bundle (A) was 1,600, and the ratio of the carbon fiber bundle (A) to the total amount of carbon fibers in the mat was 53%. The fiber volume content (Vf) of the obtained composite material was 44%.

Further, Sample pieces of 250×25 mm were cut out every n=5 from each of 0 and 90 degree directions in the shaped plate and the tensile strength of the shaped plate was measured according to JIS K7164. The measurement result of the tensile strength of the sample was 410 MPa, and the development rate of strength of reinforcement fiber was 10.3%.

Example 2

"TENAX" (registered trademark) UMS40-12K (Fiber diameter: 5 μm, Tensile strength: 4,600 MPa) manufactured by TOHO TENAX Co., Ltd. was used as a carbon fiber. As a cutting apparatus, a rotary cutter used in Example 1 was used except that the edge width was changed to 0.5 mm and the edge pitch was changed to 32 mm. As a fiber opening apparatus, a tube having small holes were prepared and compressed air was supplied via the small holes using a compressor. The wind speed through the small holes was 300 msec. The tube was placed just below the rotary cutter and the lower part of the tube had a taper tube welded. A matrix resin was supplied from the lateral side of the taper tube. PA66 fiber (T5 nylon manufactured by ASAHI KASEI FIBERS CORPORATION, Tex: 1,400 dtex) which was dry-cut by 2 mm was used as the matrix resin. Next, a table movable in X-Y directions was placed below the exit port of the taper tube and suction was made by blower from the lower side of the table. The supplying amount rate of the carbon fibers and the supplying amount rate of the matrix resin were set to 1,600 g/min and 1,000 g/min, respectively, and the opening apparatus was operated to obtain a random mat having a thickness of about 4 mm, in which the carbon fibers having the average fiber length of 32 mm and PA66 were mixed. This random mat was heated for 3 minutes at 2.5 MPa with a pressing device heated at 280° C. to obtain a shaped plate having a thickness t=1.8 mm. With respect to the obtained composite material (shaped plate), the critical single fiber number defined by formula (1) was 120, the average number (N) of carbon fibers in the carbon fiber bundle (A) was 2,800, and the ratio of the carbon fiber bundle (A) to the total amount of carbon fibers in the mat was 66%. The fiber volume content (Vf) of the obtained composite material was 51%. Further, Sample pieces of 250× 25 mm were cut out every n=5 from each of 0 and 90 degree directions in the shaped plate and the tensile strength of the shaped plate was measured according to JIS K7164. The measurement result of the tensile strength of the sample was 490 MPa, and the development rate of strength of reinforcement fiber was 10.6%.

Example 3

Two random mats were produced in a similar manner to Example 1 except that the supplying amount rate of the carbon fibers and the supplying amount rate of the matrix resin were set to 380 g/min and 300 g/min, respectively. The random mats were placed on the respective upper and lower sides of PC foam, "MIRAPOLYCA FOAM" (registered trademark) manufactured by JSP, thickness t=0.8 mm, and the layered body was heated for 10 minutes at 1.5 MPa with a pressing device heated at 300° C. to obtain a sandwich material having a thickness t=1.7 mm. The weight of the obtained sandwich material was 1.5 kg/m$^2$, and as compared with a steel plate having a thickness of 0.9 mm, the obtained sandwich material was a very lightweight panel which had 30% weight, while the obtained sandwich material had equivalent stiffness.

Example 4

Two random mats were produced in a similar manner to Example 2 except that the supplying amount rate of the carbon fibers and the supplying amount rate of the nylon that was the matrix resin were set to 380 g/min and 530 g/min, respectively. A glass mat (manufactured by CENTRAL GLASS CO., LTD., chopped strand mat, 300 g/m$^2$) as a core mat was previously set on the fixing apparatus. The random mats were stacked so that the glass mat was interposed between the two random mats, and the layered body was heated for 3 minutes at 1.5 MPa with a pressing device heated at 270° C. to obtain a sandwich material having a thickness t=1.7 mm. The density of the obtained sandwich material was 2.4 kg/m$^2$, and as compared with a steel plate having a thickness of 0.9 mm, the obtained sandwich material was a very lightweight panel which had 34% weight, while the obtained sandwich material had equivalent stiffness.

Comparative Example 1

A random mat was produced in a similar manner to Example 1 except that a rotary cutter without fiber separating mechanism and the pressure in the compressor was reduced to 0 MPa. The obtained random mat was consisted of stripe fiber bundles (24,000 filaments) all of which was those in raw fibers, and was in a state where the reverse side of the random mat can be somewhat seen through the random mat. Using this random mat, a shaped plate was produced in a similar manner Example 1. It was confirmed that portions having many overlaps of fiber bundles includes portions not impregnated with the resin, and that in portions where the density of fibers is low, the reverse side of the random mat was seen through the random mat.

What is claimed is:

1. A composite material comprising: carbon fibers having an average fiber length of more than about 10 mm and about 100 mm or less; and a thermoplastic resin,
    wherein the carbon fibers are substantially two-dimensionally-randomly oriented in the composite material,
    wherein the composite material comprises a carbon fiber bundle (A) in a ratio of about 30 volume % or more and less than about 90 volume % to a total volume of the carbon fibers, the carbon fiber bundle (A) including the carbon fibers of a critical single fiber number defined by formula (1) or more, and
    wherein an average number (N) of the carbon fibers in the carbon fiber bundle (A) satisfies formula (2), $$\text{Critical single fiber number}=600/D \quad (1)$$

$$6\times10^4/D^2<N<2\times10^5/D^2 \quad (2)$$

wherein D is an average fiber diameter (μm) of the carbon fibers.

2. The composite material according to claim 1, which includes the thermoplastic resin in an amount of about 50 to 1,000 parts by weight to 100 parts by weight of the carbon fibers.

3. The composite material according to claim 2, wherein the amount of the thermoplastic resin in the composite material is about 50 to 100 parts by weight to 100 parts by weight of the carbon fibers.

4. The composite material of claim 1, wherein the average fiber length is from about 15 mm to 100 mm.

5. The composite material of claim 4, wherein the average fiber length is from about 15 mm to 80 mm.

6. The composite material of claim 5, wherein the average fiber length is from about 20 mm to 60 mm.

7. The composite material of claim 1, wherein an average fiber diameter of carbon fibers which constitute a composite material is about 3 to 12 μm.

8. The composite material of claim 7, wherein the average fiber diameter is from about 5 to 8 μm.

9. An article comprising the composite material of claim 1.

10. The article of claim 9, which is selected from the group consisting of an inner plate, an outer plate, a component member of an automobile, and frames or housings of electrical products or machines.

* * * * *